United States Patent [19]
Kell

[11] 3,738,198
[45] June 12, 1973

[54] SHIFT INHIBITORS FOR POWER TRANSMISSION

[75] Inventor: Nathaniel B. Kell, Indianapolis, Ind.

[73] Assignee: General Motors Corporation, Detroit, Mich.

[22] Filed: Aug. 19, 1971

[21] Appl. No.: 173,087

[52] U.S. Cl. .............................. 74/868, 74/752 C
[51] Int. Cl. ...................... B60k 21/00, F16h 3/74
[58] Field of Search ..............................................
                                                    74/867–869

[56]            References Cited
           UNITED STATES PATENTS
2,899,834   8/1959   Polomski ............................ 74/867
3,313,183   4/1967   Bailey et al. ...................... 74/752 C
3,400,613   9/1968   Johnson et al. ..................... 74/869
3,587,355   6/1971   Schaefer ............................ 74/868

*Primary Examiner*—Arthur T. McKeon
*Attorney*—W. E. Finken, A. M. Heiter and Charles R. White

[57]            ABSTRACT

A change-speed planetary transmission for a vehicle with controls including a shift valve having a shift inhibiting control unit operatively connected thereto. The control unit provides for the selective establishment of a predetermined pressure in a control chamber by employing calibrated feed and exhaust orifices which provides a force to move the shift valve element to a downshift position when the opposing force of governor pressure is sufficiently reduced. When the valve downshifts there is an increase in pressure in the control chamber by the closing of the exhaust orifice to inhibit an upshift regardless of subsequent increased governor pressure.

5 Claims, 1 Drawing Figure

PATENTED JUN 12 1973
3,738,198
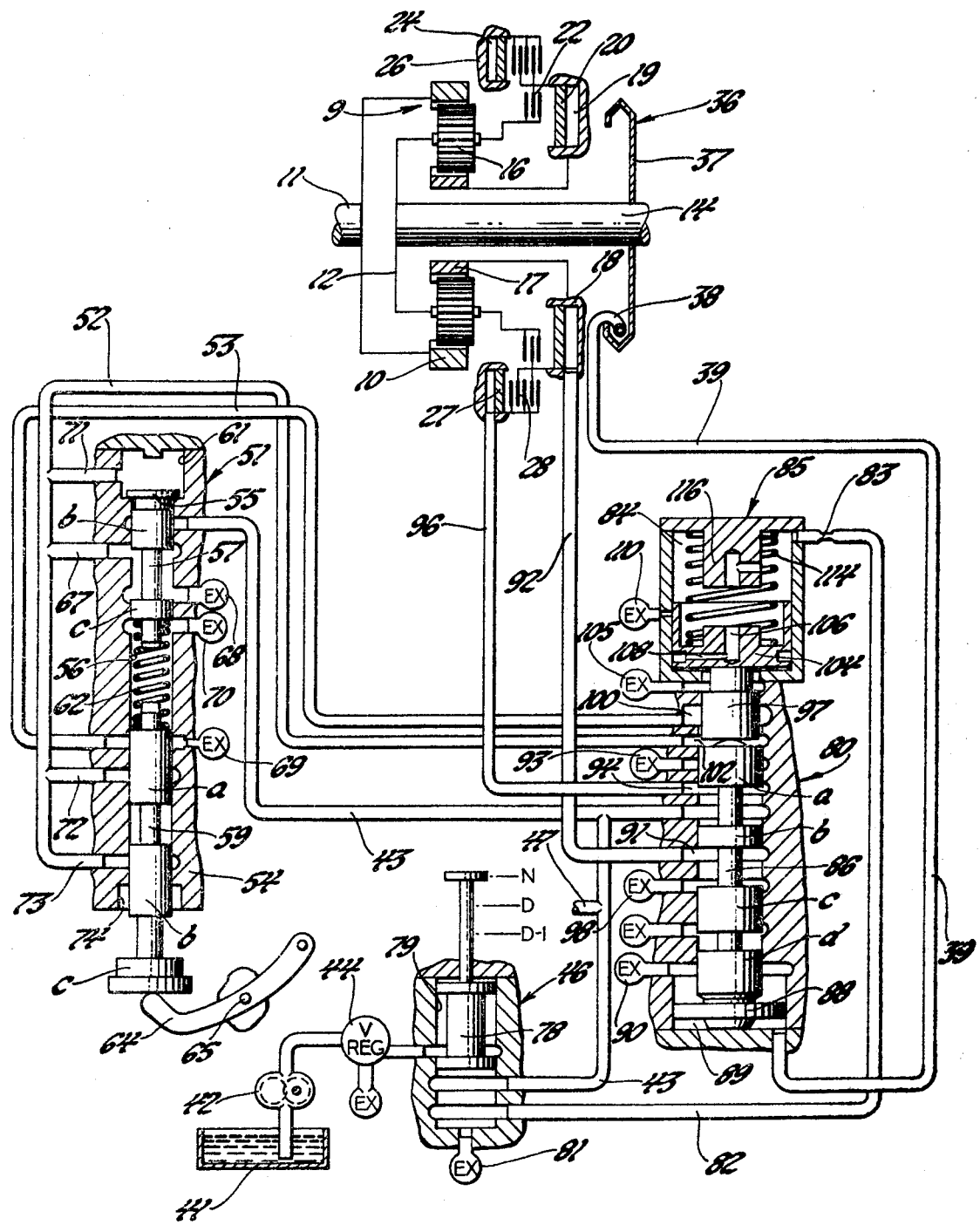
INVENTOR.
Nathaniel B. Kell
BY
Charles R. White
ATTORNEY

SHIFT INHIBITORS FOR POWER TRANSMISSION

This invention relates to power transmissions with shift controls incorporating a shift inhibitor which is selectively actuated to prevent shifts under predetermined operating conditions.

It is sometimes desirable to inhibit the shifting of an automatic transmission so that the transmission will stay in a particular gear ratio when the controls are signaling for a speed change. For example in descending steep grades in a low speed ratio it may be desirable to inhibit the automatic upshift of the transmission to a higher speed ratio as the vehicle gains speed so that the engine will be more effective in providing engine braking.

With this invention there is provided a new and improved shift inhibitor which can be selectively activated so that shift valve means in the transmission controls will shift under predetermined conditions to cause a change in transmission speed ratio. The valve means will be maintained in the shifted position by the inhibitor until the vehicle operator deactivates the inhibitor so that subsequent shifting may be accomplished. In this invention there is preferably a hydraulic actuated shift valve means which controls a planetary type change speed transmission that is responsive to operating signals from the vehicle to upshift and downshift the transmission. The shift inhibitor of this invention is operatively connected to the shift valve which includes piston means that forms an expansible control chamber whose pressure is controlled by calibrated hydraulic feed and exhaust for establishing a predetermined pressure in a cavity. When the vehicle operator desires to activate the inhibitor the cavity is charged with a pressure controlled by the orifices. When operating conditions are such that the shift valve moves to a position to downshift the transmission the exhaust orifice is closed by the piston means in the chamber so that the pressure in the cavity will rise to a maximum pressure. Preferably, this maximum pressure provides a force which cannot be overcome by the opposing forces tending to move the valve to an upshift position. The control pressure can be released at any time by the vehicle operator so that the shift valve can operate in a conventional manner.

These and other features, advantages and objects of the invention will become more apparent from the following detailed description and drawing in which:

The FIGURE diagrammatically shows a change-speed transmission and a control system.

The FIGURE in which the invention is illustrated is a two-speed transmission and control system having a planetary gearset 9 with a ring gear 10 driven by a transmission input shaft 11. The planetary gearset has a carrier 12 connected to drive an output shaft 14. Planetary pinions 16 are mounted on the carrier and mesh with the ring gear 10 and with a sun gear 17 connected to a control hub 18. The control hub contains a cylinder 19 in which an annular piston 20 is reciprocally mounted to engage a clutch or friction drive establishing device 22 to interconnect the carrier 12 and the sun gear 17 to lock up the gear unit 9 to engage high ratio or direct drive. A second cylinder 24 formed in a stationary transmission housing 26 has a reciprocating piston 27 which is actuated by fluid pressure to engage a multiplate reaction brake or friction drive establishing device 28 to connect the control hub 18 to the stationary housing 26 to thereby hold the sun gear to provide a low range speed ratio. Each piston and cylinder forms a motor which, in combination with its respective friction drive establishing device, provides a fluid-operated drive-engaging means.

The transmission has a pitot governor 36 having an annular can 37 fixed to output shaft 14 which is filled with fluid from the lubrication system so that a rotating body of fluid impinges on the opened end of a pitot tube 38 disposed inside of the can to provide a connected governor line 39 with a pressure proportional to the speed of output shaft 14.

The fluid control system has a sump 41 conventionally located in the lower portion of the transmission housing from which fluid is delivered by a pump 42 to the main supply line 43. The pressure in this line is regulated by a pressure regulator valve 44 and the directional oil flow may be controlled by a manual valve 46 which will be further described below. The main line 43 leading from the manual valve has a branch line 47 connected in a conventional manner to lubricate the transmission and to supply fluid to fill the pitot governor can 37. The main line 43 is connected to a throttle valve assembly 51 to supply a throttle valve or TV pressure to a line 52 that is proportional to torque demand or throttle pedal position and to supply a downshift pressure to a downshift line 53 for forced downshifts. The valve assembly 51 has a body 54 with a bore 56 in which a throttle regulator valve element 57 having lands $b$ and $c$ and a throttle or downshift valve element 59 having lands $a$, $b$ and $c$ are reciprocably mounted. Valve element 57 has an enlarged stop portion 55 that engages the shoulder between the bore 56 and a bore 61 to limit closing movement of this valve element so that at zero throttle, branch line 67 operatively connecting the valve assembly 51 to TV line 52 is connected to an exhaust 68. A spring 62 is located between the valve element 59 and the regulator valve element 57.

The throttle pedal controls through a suitable linkage a lever 64 which is pivoted to a fixed support at 65 and engages the end land $c$ of the valve element 59. As shown when the throttle is closed, valve element 57 is in the position connecting the throttle pressure line 52 via branch line 67 between lands $b$ and $c$ of valve element 57 to exhaust 68. In this position of the valve element 57 the downshift line 53 is connected to a restricted exhaust 69 so that no throttle pressure or downshift pressure is provided. If the throttle is advanced, the lever 64 moves the valve element 59 into the bore compressing spring 62 to provide a gradually increasing biasing force on the valve 57 to move the valve element so land $c$ of valve element 57 closes exhaust 68 and main line 43 is connected between the lands $b$ and $c$ to branch line 67 of the throttle line and is also connected by the branch line 71 to the bore 61. The pressure in bore 61 provides a force acting on the land $b$ of valve element 57 to oppose the spring force to limit the throttle pressure in line 52 proportional to the throttle pedal position. Exhaust 70 vents the spring chamber portion of bore 56. At or about full throttle position the throttle pressure, which is high and may be 70 percent of or equal to main line pressure, in a branch 72 is connected between the lands $a$ and $b$ of valve element 59 to the downshift line 53 to provide a forced downshift pressure. Throttle pressure is also connected by branch 73 between the lands $b$ and $c$ to act on the unbalanced area of land $c$ as it enters the large bore portion 74 to provide a hydraulic detent which advises the operator that a downshift pressure is being provided.

The manual valve 46 has an axially shiftable valve element 78 which is movable in a bore 79 in the valve body to different positions such as neutral position N, drive position D or the low range position D-1. In neutral the valve element 78 is in the illustrated position to block the flow of regulated pressure from the regulator valve 44 to the line 43 connected to the throttle valve 51 and to a shift valve 80. An exhaust port 81 is provided in the end of the manual valve to exhaust main line 43 when the manual valve element is in the neutral position and to exhaust the shift inhibitor which will be later described when in the neutral or drive position. In the drive position D the manual valve element is positioned to feed regulated pressure to line 43 and thus to throttle valve 51 and shift valve 80. In low range or D-1 the manual valve element 78 is in the lower position in which regulated pressure is again fed to the throttle and shift valves through line 43 while also feeding regulated pressure into a line 82 leading from the manual valve to an expansible chamber 84 provided in a shift inhibitor unit 85 disposed at one end of the shift valve 80. As shown a flow control orifice or restriction 83 is provided in the feed line 82 to control the rate of flow to chamber 84.

Shift valve 80 has a valve element 86 with lands a, b, c, and d axially movable in a bore formed in the valve body. The end land d is disposed against an end plug 88 which cooperates with the valve body to form a pressure chamber 89 which is connected to the governor line 39 leading from the pitot tube 38. The chamber above plug 88 is opened to exhaust 90 at all times. The shift valve 86 is urged toward an upshift position by a hydraulic force provided by governor pressure in chamber 89 which is proportional to vehicle speed represented by the speed of output shaft 14. The shift valve 80 has a port 91 connected to high or direct drive line 92 which leads into the cylinder 19 for piston 20 for the hydraulic control of direct drive clutch 22. An exhaust 93 provides for the exhaust of pressure fluid from low brake cylinder 24 when the shift valve element is in the upshift position.

Another port 94 in the shift valve is connected to a low range drive line 96 that leads into annular cylinder 24 for piston 27 to provide for the hydraulic control of brake 28. When the manual valve element is moved to the drive position D or low range position D-1 and the shift valve element 86 moves to the downshift position illustrated in the drawing, fluid from main line 43 enters the low range drive line 96 so that cylinder 24 is charged and piston 27 engages clutch 28 to condition the transmission for low range drive. At this time the cylinder 19 of piston 20 is connected to an exhaust 98 providing for the release of clutch 22 by piston 20.

Leading into one end of the shift valve 80 between the shift valve element 86 when in the downshifted position and an axially movable plug 97 are ports 100 and 102 operatively connected to downshift line 53 and TV line 52 respectively so that downshift and throttle valve pressure act on one end of the shift valve element 86 urging it to a downshift position.

The shift inhibitor 85 has a piston 104 mounted for axial movement therein to form an expansible chamber 84. The chamber beneath piston 104 is opened to exhaust 105 in the shift valve. This piston has an axial oil flow passage 106 which opens into chamber 84 and has a connecting radial passage 108 which is a calibrated restriction communicating with an annular groove formed in the periphery of the piston that is adapted to register with exhaust port 110 when the shift valve 86, plug 97 and piston 104 are in the upshift position. In the downshift position, the sides of the piston 104 block exhaust 110. Passage 108 is calibrated to be smaller than restriction 83 so that a reduced pressure less than regulated line pressure occurs when the manual valve element is in the Low or D-1 position and the piston 104 is in the upshifted position. The piston 104 contacts the end of plug 97 which extends out of the inhibitor into direct engagement with the upper end of the shift valve element 86.

The inhibitor further has a helical spring 114 seated in the chamber 84. One end of this spring engages the piston 104 urging it to a downshift position while the other end is disposed around an axially projecting internal stop 116 which engages and limits the upshift position of the piston 104 in which chamber 84 is connected by passages 106 and 108 with the exhaust port 110.

In the neutral position of the manual valve the valve element 78 will be positioned to block the flow into the throttle valve and the shift valve so that the transmission has no brakes or clutches applied and is in a neutral condition so that no power can flow therethrough. By placing the manual valve element 78 in the drive position D, regulated pressure flows into line 43 leading to the throttle valve and the shift valve; and line 82 is connected to exhaust 81. Under these conditions the throttle valve will supply a downshift pressure to one end of the shift valve element 86 while governor pressure in chamber 89 will supply an upshift force to the other end of the shift valve. The valve will upshift and downshift in accordance with torque demand and transmission output speed signals. The spring 114 in the control chamber of the inhibitor will urge the shift valve element toward a downshift position so that the upshift bias must overcome the control pressures from the throttle valve and the opposing force of spring 114 for an upshift.

To activate the shift inhibitor the valve element 78 is moved to the D-1 position in which regulated pressure from regulator valve 44 is fed into main line 43 and into control line 82. Under these conditions pressure fluid is fed into control chamber 84 and, assuming that the shift valve 86 and piston 104 are in the upshift position, the pressure in the chamber 84 is slightly below that required to downshift the shift valve element 86 while the governor pressure in chamber 89 is high. When governor pressure falls as when vehicle speed drops, the downshift forces on the piston 104 and the shift valve 86 will begin to move the shift valve to the downshift position. When the exhaust 110 is closed off there is a rapid increase in pressure in chamber 84 so that the shift valve snaps down and brake 28 engages as clutch 22 disengages. The higher pressure in chamber 84 is effective to prevent upshifts at a later time even at the highest governor pressures such as might occur when vehicle speed increases on descending a steep hill.

While a preferred embodiment of this invention has been shown and described, other embodiments will be apparent to those skilled in the art. Accordingly, this invention is not limited to that which has been shown and described but only by the following claims:

I claim:

1. In a transmission for a vehicle, transmission input and output means, a change speed gear unit operatively connecting said input and output means, selectively engageable and disengageable friction drive establishing means operatively connected to said gear unit to condition said gear unit for changing the speed ratio of said input and output means, a source of hydraulic pressure, a shift valve hydraulically connected between said source and said friction drive establishing means for changing the speed ratio of said input and output means, first signal means operatively connected to said shift valve providing a variable force for urging said shift valve to a downshift position, second signal means operatively connected to said shift valve providing a variable force to urge said shift valve to an upshift position, inhibitor means operatively connected to said shift valve and responsive to the selective supply of pressure thereto from said source to move said shift valve to said downshift position in further response to a reduction in force on said shift valve by said second signal means, and means in said inhibitor means for conditioning said inhibitor means for a subsequent pressure buildup therein so that the highest force exerted on said shift valve by said second signal means is unable to move said shift valve toward an upshift position.

2. The transmission defined in claim 1 wherein said shift valve comprises a valve body having a bore therein and a shift valve element mounted for longitudinal movement in said bore between said upshift and downshift positions, said inhibitor comprising a chamber adjacent to one end of said shift valve element, a hydraulically actuated piston mounted for movement in said chamber between first and second positions, contact means providing a drive connection between said piston and one end of said shift valve element, flow control means for feeding hydraulic fluid from said source to said chamber, exhaust means calibrated to exhaust fluid from said chamber at a rate that establishes a reduced pressure in said chamber when said piston is in said first position, said piston having side wall means which blocks the exhaust of fluid from said chamber when said piston moves toward said second position urging said valve element toward said downshift position so that pressure in said chamber is increased to provide a force inhibiting the movement of said valve element to said upshift position until the fluid is exhausted from said chamber.

3. The transmission defined in claim 1 wherein said shift valve comprises a valve body having a bore therein and a shift valve element mounted for longitudinal movement in said bore between said upshift and downshift positions, said inhibitor comprising a chamber adjacent to one end of shift valve element and a hydraulically actuated piston mounted for movement in said chamber between first and second positions, contact means providing a drive connection between said piston and one end of said shift valve element, connecting means for hydraulically connecting said source and said chamber, said connecting means comprising a selector valve having a valve element movable between predetermined positions to condition said transmission for neutral, automatic forward drive and low range forward drive, a passage connecting said selector valve and said chamber, said passage having restriction means for limiting the feed of hydraulic fluid from said source to said chamber; and exhaust opening communicating with said chamber, and fluid flow means in said piston registerable with said exhaust opening and calibrated to exhaust fluid from said chamber at a rate that establishes a pressure drop in said chamber when said piston is in said first position, said piston having side wall means which blocks said exhaust opening and the discharge of fluid from said chamber when said piston moves toward said second position urging said valve element toward said downshift position so that pressure in said chamber is increased to provide a force inhibiting the movement of said valve element to said upshift position until the pressure fluid is subsequently exhausted from said chamber.

4. In a control for a change speed transmission, a change speed transmission, comprising shift valve means having a valve element movable between upshift and downshift positions to cause a change in speed of said transmission, a shift inhibitor operatively connected to said shift valve for preventing movement of said shift valve element under predetermined transmission operating conditions, said inhibitor having piston means disposed therein for movement between first and second positions to define an expansible cavity, hydraulic fluid feed means for supplying fluid under pressure to said cavity, an exhaust for discharging fluid from said cavity, said piston means having a passage therein which communicates with said exhaust in said cavity when said piston means is in a first position to provide a pressure drop in said cavity, and signal means disposed at the other end of said shift valve providing a variable force for moving said shift valve toward an upshift position but allowing said shift valve to downshift to a position whereby said piston means closes said exhaust allowing the pressure in said cavity to increase so that said valve element cannot be moved to said upshift position by the force of said signal means when the increased pressure is maintained in said expansible cavity.

5. In a control for a transmission, a transmission, a shift valve having a movable valve element, the shift inhibitor for selectively restraining movement of said valve element from a first to a second position under predetermined transmission operating conditions, torque demand signal means operatively connected to said shift valve for urging said valve element to one of said positions, signal means providing a force proportional to the output speed of the transmission operatively connected to said shift valve for urging said valve element to the other of said positions, a housing, hydraulically operated piston means mounted for longitudinal movement in said housing and forming an expansible and contractable control chamber, means connecting said piston means to said valve element so that said piston means can exert a force on said shift valve element directed toward said first position, a source of fluid pressure, fluid supply means for feeding operating pressure fluid from said source of fluid pressure to said control chamber at a predetermined rate, exhaust means for feeding fluid from said chamber at a rate lower than the fluid feed rate so that there is a drop in pressure in said chamber, said exhaust means comprising fluid flow passage in said piston and a fluid exhaust port in said housing aligned with said passage when said valve element is in said second position, and closure means formed on said piston means for closing said exhaust port in response to movement of said piston means and said shift valve toward said first position so that the pressure in said chamber will increase to provide a force to restrain subsequent movement of said valve element from said first to said second position and stop means in said chamber to contact said piston means when said shift valve is at said second position so that said exhaust port in said housing is aligned with said fluid flow passage in said piston.

* * * * *